United States Patent [19]

Rousseau et al.

[11] Patent Number: 4,976,899
[45] Date of Patent: Dec. 11, 1990

[54] PROCESS FOR THE PRODUCTION OF A COMPOSITE MATERIAL WITH MATRIX AND REINFORCING FIBERS OF CARBON

[76] Inventors: Gérard Rousseau, 22 Hameau de Villepreux, 33160 Saint Aubin De Medoc; Nicole Pastureau, 3 rue du Canter, 33320 Eysines, both of France

[21] Appl. No.: 350,608

[22] Filed: May 11, 1989

Related U.S. Application Data

[62] Division of Ser. No. 159,175, Feb. 23, 1988, Pat. No. 4,863,773.

[30] Foreign Application Priority Data

Feb. 25, 1987 [FR] France ................................ 87 02496

[51] Int. Cl.[5] ....................... C23C 16/32; C01B 31/00
[52] U.S. Cl. .................................. 264/29.5; 264/29.1; 427/228; 427/249; 427/255.2; 427/397.7; 427/419.2; 427/419.7; 427/140; 427/252
[58] Field of Search ............... 427/249, 255, 255.2, 427/255.7, 376.2, 397.7, 402, 140, 226, 228, 419.2, 419.7, 252; 264/29.1, 29.5

[56] References Cited

U.S. PATENT DOCUMENTS

| | | | |
|---|---|---|---|
| 3,095,316 | 6/1963 | Hartwig | 427/374.7 |
| 3,406,044 | 10/1968 | Harris | 427/249 |
| 3,991,248 | 11/1976 | Bauer | 427/249 |
| 4,373,006 | 2/1983 | Galasso et al. | 427/249 |
| 4,397,901 | 8/1983 | Warren | 427/249 |
| 4,425,407 | 1/1984 | Galasso et al. | 427/249 |
| 4,476,164 | 10/1984 | Veltri et al. | 427/249 |
| 4,476,178 | 10/1984 | Veltri et al. | 427/249 |
| 4,487,799 | 12/1984 | Galasso et al. | 427/249 |
| 4,613,522 | 9/1986 | Vasilos | 427/249 |
| 4,661,369 | 4/1987 | Crane | 427/397.7 |
| 4,668,579 | 5/1987 | Strangman et al. | 427/249 |
| 4,766,013 | 8/1988 | Warren | 427/255.7 |
| 4,795,677 | 1/1989 | Gray | 264/29.5 |

Primary Examiner—Norman Morgenstein
Assistant Examiner—Margaret Bueker
Attorney, Agent, or Firm—Pearne, Gordon, McCoy & Granger

[57] ABSTRACT

A process for the production of a composite material with matrix and reinforcing fibers of carbon. The process comprises: (a) forming a porous substrate (2) of carbon fibers; (b) covering the surface of each fiber wih a fine silicon carbide coating (6) by chemical vapor deposition; (c) shaping the substrate; (d) embedding the substrate in a carbon matrix (4) containing at most 20% by weight siliconcarbide; (e) covering the outer surface of the matrix with an outer silicon carbide covering (10) which contains cracks (12); and (f) filling the cracks in the outer covering with at least a borosilicate glass (16).

18 Claims, 2 Drawing Sheets

PROCESS FOR THE PRODUCTION OF A COMPOSITE MATERIAL WITH MATRIX AND REINFORCING FIBERS OF CARBON

This is a division of application Ser. No. 07/159,175, filed Feb. 23, 1988 now U.S. Pat. No. 4,863,773, issued Sept. 5, 1989.

DESCRIPTION

The present invention relates to a composite material of the carbon—carbon type, which is unoxidizable at high temperature and in particular up to 1700° C. in air, as well as to its production process.

This composite material is more particularly intended for use as a high performance heat protection for space vehicles (aircraft or shuttle) having to resist heating caused by the friction of the air when they enter the atmosphere at high speed.

However, the invention is also applicable to other industrial fields requiring a refractory material retaining good mechanical properties above 1100° C. in a corrosive medium. This is in particular the case with high performance jet engines operating at high temperatures between 1300° and 1400° C., as well as certain industrial heat recuperators.

The major problem of composite materials of the carbon—carbon type is their oxidation in air high temperature leading to the conversion of carbon into CO or $CO_2$ and consequently the deterioration, or even destruction of the composite material. Various processes have already been considered for avoiding this oxidation in connection with the protection of carbon materials based on the use of a silicon carbide coating formed on the outer surface of the composite material parts.

This external SiC covering or coating can be obtained by the conversion into silicide or the silicidation of carbon of the outer part of the composite material. This surface silicidation of the composite material is performed either by pack cementation, as described in US-A-3 095 316, or by chemical vapour phase deposition (CVPD), as described in US-A-3 406 044.

This outer coating can also be directly produced by chemical vapour phase deposition of silicon carbide by chlorosilane vapour cracking, either being used alone or associated with hydrogen and/or hydrocarbons, as described by the article of S. AUDISTO in Actualite'-Chimique, September 1978, pp. 25–33.

Other methods associate silicidation of the surface carbon of the composite material with a chamical vapour phase deposition of SiC (cf. US-A-3 406 044).

The aforementioned methods for forming a SiC coating on a composite material of the carbon—carbon type lead to the obtaining of a cracked coating, because of the variation in the expansion coeficients between the carbon of the composite material and the silicon carbide of the outer covering.

In order to obviate this disadvantage, with the deposition of the SiC covering is associated the deposition of a silicon dioxide covering ($SiO_2$) for filling or sealing the cracks in the SiC protective covering (cf. Weight Uncertainty Analysis for Space Shuttle Reinforced Carbon—Carbon—SAWEPAPER 1265, 37 th Annual Conference, 8–10 May 1978, SAWE).

In order to improve the filling of the cracks of the SiC coating and therefore increase the protection of the carbon—carbon material, consideration has also been given to the use of a covering based on SiC powder and a glass based on sodium silicate, to which can optionally be added sodium borate, or based on aluminium phosphate or alumina, as described in US-A-4 500 602. These glasses serve to lower the temperature from 1200°/1300° C. to 800° C., as from which the filling of the SiC coating cracks becomes effective.

The same type of result is obtained by adding boron during the formation of the SiC coating by pack cementation (cf. US-A-4 416 164). The glass which then naturally forms on the outer SiC coating heated in air during the reentry of space vehicles into the atmosphere is a borosilicate with a lower melting point than silicon dioxide.

All the processes described hereinbefore are effective to a certain extent, but all suffer from the disadvantage of providing fragile surface protections and these become inoperative if they are stopped under the action of an impact, a vibration or friction occurring in the space field before or during a vehicle flight.

The present invention relates to a composite material with a matrix and reinforcing fibers of carbon, which is coated with an outer coating, as well as to its production process making it possible to obviate disadvantages, whilst retaining the conventional production procedure for such a material and whilst in particular preserving the deformability of the fibrous substrates so as to permit their shaping prior to their densification. This composite material is made unoxidizable in the presence of air for temperatures up to 1700° C.

More specifically, the present invention relates to a composite material having a carbon fibre substrate and an outer filled silicon carbide coating characterized in that the surface of each fibre is coated with a first fine silicon carbide coating, in that the substrate is embedded in a carbon matrix doped with amorphous silicon carbide with at the most 20% by weight of the matrix and in that the filling of the outer coating comprises a borosilicate glass.

The terms matrix and fibers of carbon is understood to means fibres and a matrix made independently of vitreous carbon or graphite. Preferably, the substrate is obtained by weaving.

The use of silicon carbide on the surface of the substrate fibres and in the carbon matrix makes it possible to ensure anti-oxidation protection by greatly slowing down the oxidation in the core of the composite carbon—carbon material of the improved type, in the case of an accidental destruction, scaling or chipping of the outer coating or covering.

Thus, the characteristics and effectiveness of the composite material are guaranteed at least up to the end of the mission taking place (e.g. during the reentry of a space vehicle into the atmosphere).

The slowing down of the oxidation penetration is in particular due to the preferred oxidation at high temperature (above 600° C.) of the silicon carbide (SiC) of the matrix compared with the carbon or graphite of the latter in the case of an accidental oxygen penetration into the matrix. This oxidation of SiC gives silica (silicon monoxide, silicon dioxide) leading to an increase in volume of approximately 2.18 times, which therefore increases the proportion of the matrix in proportion to the amount of SiC present therein. This volume increase associated with the melting of the silica at above 1300° C. closes the cracks and pores in the carbon matrix, thus very considerably slowing down the penetration of the oxygen into the composite material and consequently its oxidation.

This preferred oxidation of the SiC of the matrix only occurs if it is in very divided form. Thus, SiC is only a refractory carbide due to the formation on its surface of a protective SiO$_2$ coating and the size of the SiC grains must be of the order of magnitude of the thickness of said protective SiO$_2$ coating, i.e. below 0.05 micrometer.

Moreover, the fine SiC coating covering each fibre of the substrate, without impairing the mechanical properties or flexibility thereof, protects these fibres from oxidation by also slowing down the penetration speed of said oxidation.

Advantageously, the matrix contains silicon carbide in highly divided form in a proportion of 2 to 10% weight of the matrix. This small SiC proportion in the matrix, whilst ensuring an effective anti-oxidation protection, in no way modifies the physical properties of the carbon matrix.

The outer silicon carbide coating or covering with a thickness of at the most 600 micrometres and which covers all the outer surfaces of the material ensures the feeling of the composite material against the penetration of oxidizing gas and in particular oxygen.

In order to fill the cracks of the outer silicon carbide covering, the composite material according to the invention is completed by a silica impregnation, then another impregnation by a borosilicate glass (SiO$_2$—B$_2$O$_3$). The latter impregnation constitutes the outer coating of the composite material and is the ultimate originality of the invention.

These fillings with SiO$_2$ and SiO$_2$—B$_2$O$_3$ make it possible to considerably slow down the rate at which oxygen penetrates the composite material through naturally cracked SiC coating in the temperature range 600° to 1700° C. For temperatures above 1300° C., it is the silica which ensures the slowing down and for teperatures below 1300° C. it is the borosilicate glass.

Advantageously, the surface of each carbon-containing fibre is provided with a second and in particular pyrolytic carbon coating. This carbon coating covering the fibres constitutes an interface serving to preserve, or improve the mechanical properties of the composite material. Thus, the sliding of the graphite layers of the pyrolytic carbon ensures weak fibre—matrix bonds, thus giving a good resilence to the composite material.

This pyrolytic carbon coating is extremely thin and at the most equal to 0.1 micrometer. It can be deposited prior to the deposition of the SiC coating covering the fibres or after the deposition of said SiC coating.

The fibrous substrate of the composite material according to the invention can be formed from carbon or graphite fibres obtained from any random precursor and in particular from polyacrylonitrile, known under the abreviation P. A. N., pitch or rayon.

Moreover, as a function of the desired final properties for the composite material, these fibres can be short or long, have a high resistance or a high modulus and may have undergone possible graphitization treatments.

The invention also relates to a process for the production of a composite material of the carbon—carbon type, as described hereinbefore.

According to a first feature, this process comprises the following stages:

(a) formation of a deformable, porous substrate or structure constituted by carbon fibres.

(b) covering the surface of each fibre of the substrate by a first fine silicon carbide coating, so that the substrate retains its deformability.

(c) shaping the substrate, (d) densification of the shaped substrate to form the matrix by a carbon material containing finely divided, amorphous silicon carbide and representing at the most 20% by weight of the matrix, (e) covering the outer surface of the matrix with an outer silicon carbide covering, (f) filling the outer covering using a borosilicate glass.

According to the invention, stage (c) of the process can be performed before or after stage (b).

The porous substrate is obtained by weaving or filamentary winding of carbon fibres in one, two or three dimensions and in n directions.

According to the invention, it is possible to form the first silicon carbide coating of fibres by chemical vapour phase deposition of at least one organosilane substituted or not substituted by at least one halogen, whereby this is in particular carried out with a reduced pressure, between approximately 100 and 4000 Pascal, in an insothermal furnace and at a low temperature between 850° and 1000° C.

According to the nature of the organosilane, it is possible to associate with the latter hydrogen and/or at least one gaseous hydrocarbon.

No matter what the mixture used, the pressure conditions of approximately 500 Pa, the temperature conditions of approximately 950° C. and the gaseous flowrate are fixed in such a way that the kinetics of the SiC deposit, catalyzed by the surface of the fibre, is limited compared with the diffusion rate of the chamical species used. This diffusion makes it possible to form a SiC coating of uniform thickness ranging between 0.1 and 0.2 micrometer, both in the core and towards the outside of the substrate. This limited SiC coating thickness preserves the deformability of the substrate for its shaping prior to densification or rigidification.

The inventive densification of the porous substrate corresponding to the formation of the SiC-doped carbon matrix is obtained by different modifications of the known densification processes by carbon or graphite, such as pyrolysis of thermosetting resin with a high carbon proportion or gaseous hydrocarbide cracking.

In the case of the densification of the porous substrate by the pyrolysis of a thermosetting resin, the supply of silicon carbide to the carbon matrix is obtained by grafting on the molecules of the polymer functional groups containing Si—O bonds, the latter supplying during the thermal pyrolysis treatment the silicon carbide divided on the scale of the atom.

Advantageously, use is made of a carbon-containing polymer with 6 to 25% by weight of functional groups having Si—O bonds. These Si—O bonds are silicone-type functions.

Examples of pyrolysible polymers making it possible to produce a carbon matrix, as well as protect it from oxygen, reference is made to phenolic resins of the resol type and furan resins on which silicone functions have been grafted by chemical reaction.

Densification by a modified thermosetting resin involves several cycles each comprising the impregnation by the resin, polymerization, followed by heat treatment to stabilize the resin, pyrolysis for transforming the resin into hard coke and heat treatment at high temperature to transform the Si—O groups into silicon carbide.

It is also possible to form the carbon-containing matrix according to the invention by chemical vapour phase deposition of a mixture formed by at least one hydrocarbon and at least one organosilane substituted or not substituted by at least one halogen. The hydrocarbon can consist of saturated hydrocarbons, such as methane, ethane, propane or butane.

The organosilanes (or alkylsilanes) usable in the invention are tetramethylsilane and chlorosilanes of type $C_xH_ySiCl_z$ with x, y and z being positive integers satisfying the conditions $y+z=4$, $y=3x$ and $0<z<4$. Reference is e.g. made to trichloromethylsilane and dichlorodimethylsilane.

The organosilane percentage varies from 1 to 8% by weight of the hydrocarbon—organosilane mixture. This organosilane percentage is dependent on the respective reactivity of the gases or vapours at the temperatures and pressures used and which are imposed by the nature of the hydrocarbon or hydrocarbons chosen for obtaining an anisotropic carbon deposit, as well as the desired silicon carbide proportion in the carbon matrix.

The densification conditions are also adjusted to bring about the formation of SiC in very highly divided form and in the amorphous state in the carbon matrix.

The densification of the porous structure or substrate, according to the method used, the proportion of the fibres and the nature of the fibres make it possible to obtain a final density of the composite material between 1.4 and 1.8. In addition, the open porosity of the matrix corresponding to the volume of the communicating pores is below 14%.

According to a preferred embodiment of the inventive process, an outer silicon carbide coating is formed by silicidation of the outer surface of the densified structure. The silicidation of the surface of the carbon—carbon material is in particular carried out by pack cementation, i.e. the material to be silicided is immersed in a powder mixture which, by heating, gives off vapours of siliciding substances, which are silicon and/or silicon monoxide. The corresponding chemical reaction are as follows:

$$Si + C \rightarrow SiC$$

$$SiO + 2C \rightarrow SiC + CO$$

The mixture of powders used supplying the silicon and silicon monoxide vapours is consttituted by a silicon powder and at least one random oxide able to react with the silicon for supplying silicon monoxide. The oxide used can be silica ($SiO_2$) or alumina ($Al_2O_2$).

Advantagously, to this mixture of silicon and oxide is added silicon carbide powder making it possible to dilute the reactive elements and thus prevent, during their melting, that they agglomerate and run on the densified structure.

The temperature to be reached for forming silicon and SiO vapours is above 1650° C., but below 1800° C., which is the fritting temperature of SiC. A heat treatment at a temperature above 1800° C., which would lead to a hardening of the powder mixture, would prevent the mould removal of the coated material of the SiC coating.

The silicidation of the carbon or graphite of matrix is carried out in the presence of a neutral gas such as helium, argon, neon, etc.

The duration of the immersion of the densified structure in the powder mixture at the chosen temperature makes it possible to fix the thickness of the carbon matrix coating, which is converted into SiC, whereby said coating has a thickness of 200 to 600 micrometers.

During silicidation of the densified structure, the graphite or carbon fibres protected by their silicon carbide coating are not completely transformed into carbide.

Although the silicidation of the densified structure makes it possible to form a surface coating with a SiC thickness of 200 to 600 micrometers, there is also the formation of an underlying 40 200 micrometer thick silicon carbide/carbon composite layer resulting from the preferred silicidation of the carbon of the matrix, the carbon of the fibres only being partly silicided as a result of the SiC sheath of the fibres slowing down the transformation.

As a result of the preferred silicidation of the carbon of the matrix and the presence of the SiC coating surrounding the fibres of the substrate, the outer SiC coating obtained by silicidation has a resilience greater than that of conventional carbon/carbon composites and is not liable to become disengaged, unlike a silicon carbide coating on a conventional carbon—carbon composite.

The continuity of the composite material on passing progressively from the carbon/carbon composite to the silicon carbide/carbon composite ensures a good adhesion of the outer SiC coating to the carbon-containing matrix.

According to the invention, it is also possible to form the first outer SiC coating of the carbon—carbon composite by chemical vapour phase deposition of one or more organosilanes substituted or not by at least one halogen.

As a function of the nature of the organosilane or organosilanes used, it is possible to associate therewith at least one gaseous hydrocarbon and/or hydrogen.

Deposition is carried out at constant pressure and temperature, their values as well as those of the gaseous flowrates being dependent on the nature of the gases used and the nature of the sought deposit. In order to obtain an outer SiC coating of good quality, the deposition thereof by thermal organosilane deposition can be obtained in two succesive phases.

In the first phase infiltration conditions are such as to obtain an impregnation and filling of the pores of the densified structure with pressures, temperatures and low flowrates aiding the diffusion of gases with respect to the deposition reaction speed thereof.

The impregnation and filling of the pores of the densified structure makes it possible to stop the penetration of the oxidizing gas (e.g. atmospheric oxygen) through the cracks of the outer SiC coating deposited in the second phase, whilst also increasing the quality of its attachment to the carbon-containing matrix.

In the second phase, the outer SiC coating deposition conditions are brought about by increasing the kinetics of the deposition reaction by increasing the pressures, temperatures and gaseous flow rates.

The hydrocarbons used for producing the first SiC coating of the densified structure, as for the SiC fibre protection sheath, are in particular methane, ethane, propane and butane and the organosilanes are in particular tetramethylsilane and chlorosilanes in the form $C_xH_ySiCl_z$.

Usable gaseous mixtures are trichloromethylsilane in the presence of hydrogen in a ratio of $[H_2]/[CH_3SiCl_3]=4$ to 12, trichloromethylsilane in the presence of butane and hydrogen in the ratios: $[H_2]/[CH_3SiCl_3]=1$ to 8 and $[C_4H_{10}]/[CH_3SiCl_3]=1$ to 5, tetramethylsilane alone, tetramethylsilane to which ethane has been added in excess with a ratio of $[C_2H_6]/[(CH_3)_4Si]=5$ to 50, and dichlorodimethylsilane in the presence of methane and hydrogen in the ratios: $[H_2]/[(CH_3)_2SiCl_2]=2$ to 5 and $[CH_4]/[(CH_3)_2SiCl_2]=2$ to 5.

With a view to filling the cracks of the outer SiC coating of the densified structure, it is possible to use a silica coating ($SiO_2$) deposited on the surface and in the cracks of the SiC coating by vacuum impregnation in an alcoholic alkyl silicate solution and in particular ethyl polysilicate or ethyl orthosilicate. The impregnation number is between 2 and 8.

Between each impregnation, drying takes place at approximately 100° to 110° C. and after the final impregnation the material is baked.

With a view to improving the protection of the composite material according to the invention, there is a supplementary filling on the silica coating with a borosilicate glass ($SiO_2$—$B_2O_3$), whereof the boric oxide proportion varies from 1 to 10% by weight.

This glass coating is deposited by vacuum impregnation from a gelling solution obtained in particular by hydrolysis and then polycondensation of a boron alkoxide and a silicon alkoxide in appropriate proportions for obtaining a glass with the desired $B_2O_3$ composition.

The number of impregnations in this gelling solution is between 1 and 3. Between each of these impregnations, there is a drying and the final impregnation is followed by baking.

According to another feature of the inventive process, the porous structure fibres can be coated with an anisotropic carbon coating obtained by CVPD of one more hydrocarbons. This anisotropic carbon deposition is carried out under conditions aiding the diffusion of hydrocarbons into the carbon-containing structure with respect to their deposition rate on the surface of the fibres. These conditions involve temperatures of approximately 1000° C., pressures of approximately 1000 Pa and low gaseous flowrates. This makes it possible to obtain on each fibre a uniform deposit of at the most 0.1 micrometer of pyrolytic carbon, whereof the graphite layers are oriented parallel to the surface of the corresponding fibre.

Other features and advantages of the invention can be gathered from the following description given in an illustrative and non-limitative manner with reference to the drawings, wherein show.

Figure 1A:
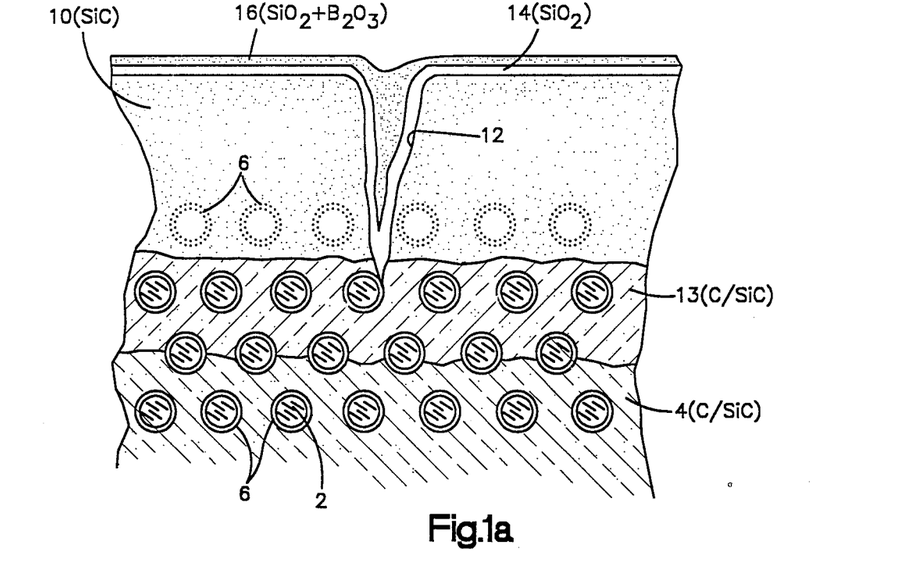
FIGS. 1a and 1b Diagrammatically and in longitudinal section a composite material according to the invention, whereof the SiC coating is respectively obtained by silicidation and CVPD.
Figure 1B:
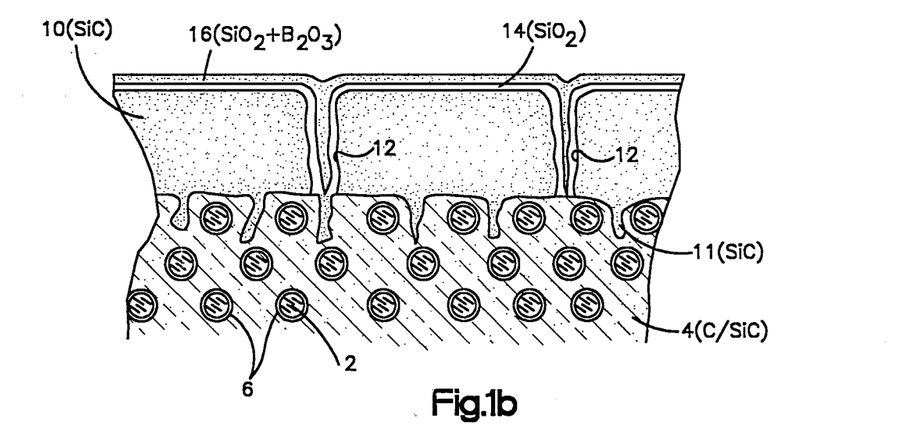

In FIGS. 1a and 1b is shown a carbon—carbon composite material having carbon reinforcing fibres 2, embedded in a pyrolytic carbon matrix 4 which, according to the invention, contains at the most 20% and e.g. 2 to 10% by weight of silicon carbide, greatly reducing the oxidizibility of the carbon-containing matrix in the presence of oxygen up to 1700° C. The fibres 2 are e.g. fibres wound in the same direction and having a thickness of approximately 10 micrometers.

Figure 2A:
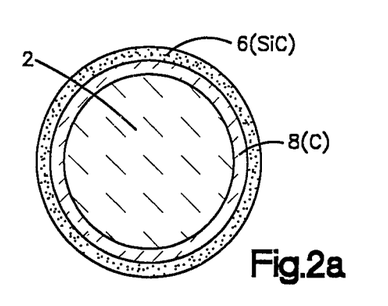
FIGS. 2a and 2b Diagrammatically and in longitudinal section a carbon-containing fibre of a protected composite material according to the invention.
Figure 2B:
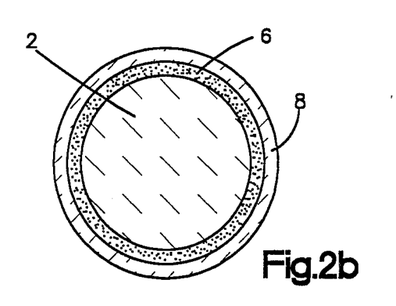

According to the invention, each fibre 2 is coated with a silicon carbide coating 6 with a thickness of 0.1 to 0.2 micrometer approximately, protecting the fibre from possible oxidation by slowing down oxygen diffusion. This silicon carbide coating is optionally associated with a pyrolytic carbon coating 8 with a thickness of at least 0.100 micrometer. This pyrolytic carbon coating 8 can be inserted between fibre 2 and the silicon carbide coating 6, as shown in FIG. 2a, or can cover the SiC coating, as shown in FIG. 2b.

According to the invention, the carbon—carbon material resulting from the combination of the substrate of fibres 2, 6 and matrix 4, as shown in FIGS. 1a and 1b, following densification, is covered with a silicon carbide coating 10. The cracks 12 in the silicide carbon coating 10 are filled with silica 14 with a thickness of 2 to 5 micrometers. This silica filling 14 is completed by a borosilicate glass 16 ($SiO_2$—$B_2O_3$) with a thickness of 1 to 4 micrometers and containing 1 to 10% of boric oxide.

The outer coating 10 of SiC only (FIG. 1b), obtained by CVPD has a thickness of 40 to 600 micrometers, whilst the outer SiC coating 10 associated with an underlying C/Sic coating 13 (FIG. 1a), obtained by silicidation, has a thickness of 200 to 600 micrometers, the underlying coating 13 then having a thickness of 40 to 200 micrometers.

Tests were performed in air at 1500° C.:

(a) on a prior art composite material formed solely from carbon fibres embedded in a carbon matrix;

(b) on a composite material according to the invention having carbon fibres coated solely with silicon carbide coating and a carbon-containing matrix containing 3% by weight of silicon carbide and silicided;

(c) on another composite material according to the invention having carbon fibres coated both with the pyrolytic carbon coating and the coating of a silicon carbide, a carbon-containing matrix containing 3% silicon carbide, said material also being successively covered with silicon carbide and then filled with silica and $SiO_2$—$B_2O_3$ glass.

The oxidation rates of these three composite materials are respectively 2.2, 0.05 and 0.002 kg/m$^2$/h.

It can be gathered from these tests that the carbon of the composite material according to the invention is difficult to oxidize.

Examples will now be given of the production of a composite material according to the invention.

EXAMPLE 1

This production example will be described with reference to FIG. 3.

The first stage of the process, as represented by block 20, consists of forming a deformable, porous carbon structure, by weaving carbon fibre wicks in three orthogonal directions and in known manner. These fibre wicks are formed from approximately 3000 filaments of the TORAY type with a high modulus M40.

The second stage of the process, represented by block 22a, consists of depositing an approximately 0.08 micrometer thick pyrolytic carbon coating on each fibre. This carbon is formed in a furnace heated to 1100° C. in which methane circulates under a pressure of 15 mbars for 2 hours.

The following stage of the process, represented by block 24a, consists of circulating in the same furnace a mixture of trichloromethylsilane and hydrogen in a $[H_2]/[CH_3SiCl_3]$ ratio of 8 at a pressure of 10 mbars for 10 hours, in order to form a 0.1 to 0.2 micrometer SiC deposit. The substrate is then shaped, as indicated at 25.

Figure 3:
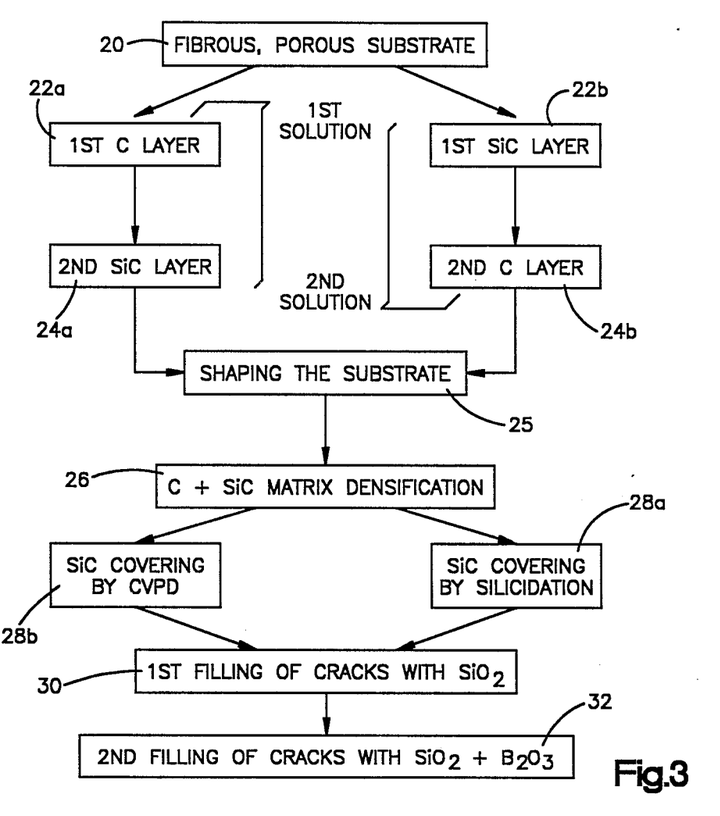
FIG. 3 A diagram illustrating the different stages of the process for producing a composite material according to the invention.

The following stages relate to the densification of the porous structure with a view to forming the C/SiC composite matrix, as indicated by block 26 in FIG. 3.

To this end, the porous structure is vacuum impregnated by a phenolic resin, on to which 10% silicone function has been grafted. The impregnated structure is then polymerized under a pressure of 5 bars to a temperature of 180° C. and then the crust is removed to take away the excess resin. This is followed by post-baking at 250° C. for 4 hours, in order to stabilize the polymerized, crosslinked resin.

This is followed by pyroloysis of the stabilized resin at 900° C. making it possible to transform the carbon chain of this polymer into hard coke (or vitreous carbon). A subsequent heat treatment between 1200° and 1800° C. makes it possible to transform the Si—O bonds of the polymer into SiC. These impregnation, polymerization, post-baking, pyrolysis and subsequent heat treatments are performed 5 times in succession.

The final density of the material is approximately 1.5. Moreover, the open porosity of this structure is below 7%.

The thus obtained material is machined and then silicided in a mixture of powders constituted by 8 to 12% by weight of alumina, 25 to 35% by weight of silicon and 55 to 65% by weight of silicon carbide. These powders have a grain size distribution of 30 to 70 micrometers (i.e. 200 to 325 mesh) and an apparent density, after compacting, of 1.

This silicidation is performed in a graphite crucible placed in the same furnace as hereinbefore in an argon atmosphere, at 1700° C. and for 2 hours.

As shown in FIG. 1b, this leads to a SiC surface coating 10 and an underlying composite C/SiC coating 13, the total thickness of the protective coating (SiC+C/SiC) varying between 40 and 600 micrometers. The surface coating 10 extends beyond the first row of fibres, shown in mixed line form, of matrix 4 and the SiC content of the coating 13 exceeds that of the matrix. This stage is illustrated by block 28a in FIG. 3.

The aforementioned densified and silicided structure is then vacuum impregnated with an alcoholic solution of ethyl silicate containing:
ethyl polysilicate: 1 mole
ethanol: 13.3 moles
$H_2O$: 5.1 moles
HCl: 1.6 moles/liter of water.

Following this impregnation, drying takes place for 1 hour at between 100° and 110° C. These two impregnation and then drying operations are repeated 4 times. Finally, the covering is baked at 300° C. for approximately 6 hours.

The cracks are filled with a silica coating with a thickness of 2 to 5 micrometers, as a function of the cracks. This stage is illustrated by block 30 in FIG. 3.

In order to complete the filling of the cracks of the outer silicon carbide covering 10, on the $SiO_2$ covering is formed a $SiO_2$—$B_2O_3$ glass, the corresponding stage being represented by block 32 in FIG. 3.

To this end, the structure obtained under vacuum is impregnated in an alcogel solution, which is the precursor of borosilicate glass. This alcogel is obtained by hydrolysis and then polycondensation of a silicon alkoxide and a boron alkoxide in proportions 91% silicon alkoxide and 9% boron alkoxide.

Following alcogel impregnation of the structure, drying takes place for 1 hour at between 100° and 110° C. The impregnation and drying stages are repeated twice. Finally baking takes place for 6 hours at approximately 300° C.

EXAMPLE 2

Under the same operating conditions as described hereinbefore, it is possible to protect the fibrous structure by firstly depositing the silicon carbide coating and then the pyrolytic carbon coating. These stages are represented by blocks 22b and 24b in FIG. 3.

EXAMPLE 3

This example differs from example 1 by the fact that the outer silicon carbide covering of the matrix, instead of being formed by surface silicidation of the matrix, is obtained by the chemical vapour phase deposition of a silicon carbide coating. This stage is illustrated by block 26b in FIG. 3.

To this end, the densified porous structure is placed in an isothermal furnace heated to 900° C. and in which circulates a mixture of trichloromethylsilane and hydrogen in a $[H_2]/[CH_3SiCl_3]$ ratio of 8, under a pressure of 10 mbars and a gaseous flowrate of approximately 8 Nl/h (normal liters per hour), as a function of the volume of the furnace used.

This operation is performed for 4 hours. As shown in FIG. 1b, it makes it possible to diffuse silicon carbide into the interior of the densified structure, thus filling the matrix pores 11.

One of the faces of the densified structure is then exposed to the action of the same gaseous mixture at a pressure of 100 mbars, a temperature of 1100° C. and a gaseous flowrate multiplied by 10 for 8 hours. This makes it possible to obtain a 100 micrometer outer silicon carbide covering 10. The structure is then turned over and a new cycle is carried out under the same conditions.

Filling with silica and borosilicate glass is then carried out as in example 1.

EXAMPLE 4

This example differs from example 1 by the way in which the porous structure is densified (block 26). In this example, densification is carried out by CVPD of a gaseous mixture containing methane and tetramethylsilane in a $[CH_4]/[Si(CH_3)_4]$ ratio of 500. This chemical deposition is carried out in an isothermal furnace kept at 1100° C. for approximately 700 hours, the gaseous mixture being circulated under a pressure of 10 mbars.

The carbon-containing matrix is then protected by the outer silicon carbide covering as in examples 1 or 3. The cracks are then filled with silica and borosilicate glass as in example 1.

The above examples relate to the heat protection of spacecraft reentering the atmosphere at hihg speed. However, obviously the composite material according to the invention can be used in other industrial fields, where a refractory and/or stainless material is sought, which retains good mechanical properties at above 1100° C. in a corrosive and in particular oxidizable medium. This is the case with certain jet engines or certain industrial heat recuperators.

As a function of the envisaged application, the duration of the deposits and heat treatments, their thickness and the number thereof could be modified. In particular, the deposits of pyrolytic carbon on the fibrous structure, the filling of the cracks of the coating with silica or borosilicate glass and optionally the outer coating or covering of the silicon carbide matrix could be eliminated.

We claim:

1. A process for the production of a composite material having a substrate (2) of carbon fibers embedded in a matrix (4), characterized in that it comprises the following stages:
    (a) forming a deformable, porous substrate constituted with carbon fibers (2) and comprising pores,
    (b) covering the surface of each fiber (2) of the substrate with a fine silicon carbide coating (6) by chemical vapor deposition, so that the substrate retains its deformability,
    (c) shaping the substrate,
    (d) densifying the shaped substrate to form the matrix with a carbon material containing finely divided, amorphous silicon carbide and representing at the most 20% by weight of the matrix (4),
    (e) covering the outer surface of the matrix with an outer silicon carbide covering (10) comprising cracks (12),
    (f) filling the cracks of the outer covering with at least a borosilicate glass (16).

2. Production process according to claim 1, characterized in that the densification consists of pyrolizing a carbon-containing polymer having functional groups with Si—O bonds.

3. The process according to claim 2, characterized in that the polymer is a phenolic resin to which have been grafted functional groups containing Si—O bonds.

4. The process according to claims 2 or 3, characterized in that said functional groups represent 6 to 15% by weight of the polymer.

5. The process according to claim 1, characterized in that the densification consists of thermally depositioning a mixture of hydrocarbon and organosilane, which may or may not be substituted by at least one halogen.

6. The process according to claim 5, characterized in that the organosilane constitutes 1 to 8% by weight of the mixture.

7. The process according to claim 1, characterized in that the SiC coating (6) is obtained by chemical vapor deposition of at least one organosilane, substituted or not substituted by at least one halogen.

8. The process according to claim 1, characterized in that the SiC coating (6) is obtained by chemical vapor deposition of a mixture containing at least one organosilane, substituted or not substituted by at least one halogen and at least one compound chosen from the group consisting of hydrogen and a hydrocarbon.

9. The process according to claim 1, characterized in that the pores (11) of the densified substrate are previously filled with silicon carbide deposited by chemical vapor deposition under infiltration conditions.

10. The process according to claim 1, characterized in that the outer covering (10) is obtained by silicidation of the outer surface of the densified structure.

11. The process according to claim 1, characterized in that cracks (12) of the outer covering (10) are also heated filled with silica (14).

12. The process according to claim 11, characterized in that the heating filling with silica (14) is carried out by impregnation using an alcoholic solution of a polysilicate (16).

13. The process according to claim 1, characterized in that the filling heating with borosilicate glass (16) takes place by impregnating the densified structure in a mixture of silicon alcogel and boron alcogel.

14. The process according to claim 1, characterized in that the surface of each fiber of the porous substrate is covered with a carbon coating (8), following the putting into place of the SiC coating (6).

15. The process according to claim 1, characterized in that the fibers are covered with a carbon coating (8) before putting into place the SiC coating (6).

16. The process according to claims 14 or 15, characterized in that the carbon coating (8) is formed by chemical vapor deposition of at least one hydrocarbon.

17. The process according to claim 1, wherein the outer covering (10) is obtained by chemical vapor deposition of at least one organosilane, substituted or not substituted by at least one halogen.

18. The process according to claim 1, wherein the outer covering (10) is obtained by chemical vapor deposition of a mixture containing at least one organosilane, substituted or not substituted by at least one halogen and at least one compound chosen in the group consisting in hydrogen and a hydrocarbon.

* * * * *

UNITED STATES PATENT AND TRADEMARK OFFICE
CERTIFICATE OF CORRECTION

PATENT NO. : 4,976,899

DATED : December 11, 1990

INVENTOR(S) : Rousseau et al.

It is certified that error appears in the above-identified patent and that said Letters Patent is hereby corrected as shown below:

Column 1, line 28, after "air" insert --at--.

Column 3, line 36, delete "tepera-" and insert --tempera--.

Column 4, line 30, delete "chamical" and insert --chemical--.

Column 6, line 8, after "40" insert --to--.

Claim 2, Column 11, line 24, delete "Production" and insert --The--.

Claim 11, Column 12, line 16, delete "heated".

Claim 12, Column 12, line 18, delete "heating".

Claim 13, Column 12, line 22, delete "heating".

Signed and Sealed this

Nineteenth Day of May, 1992

Attest:

DOUGLAS B. COMER

Attesting Officer

Acting Commissioner of Patents and Trademarks

UNITED STATES PATENT AND TRADEMARK OFFICE
CERTIFICATE OF CORRECTION

PATENT NO. : 4,976,899

DATED : December 11, 1990

INVENTOR(S) : Rousseau et al.

It is certified that error appears in the above-identified patent and that said Letters Patent is hereby corrected as shown below:

On the Title Page item [73] the assignee should read:

--Assignee: Aerospatiale Societe Nationale Industrielle, Paris, France--.

Signed and Sealed this

Fifteenth Day of September, 1992

Attest:

DOUGLAS B. COMER

*Attesting Officer*     *Acting Commissioner of Patents and Trademarks*